Patented Feb. 12, 1929.

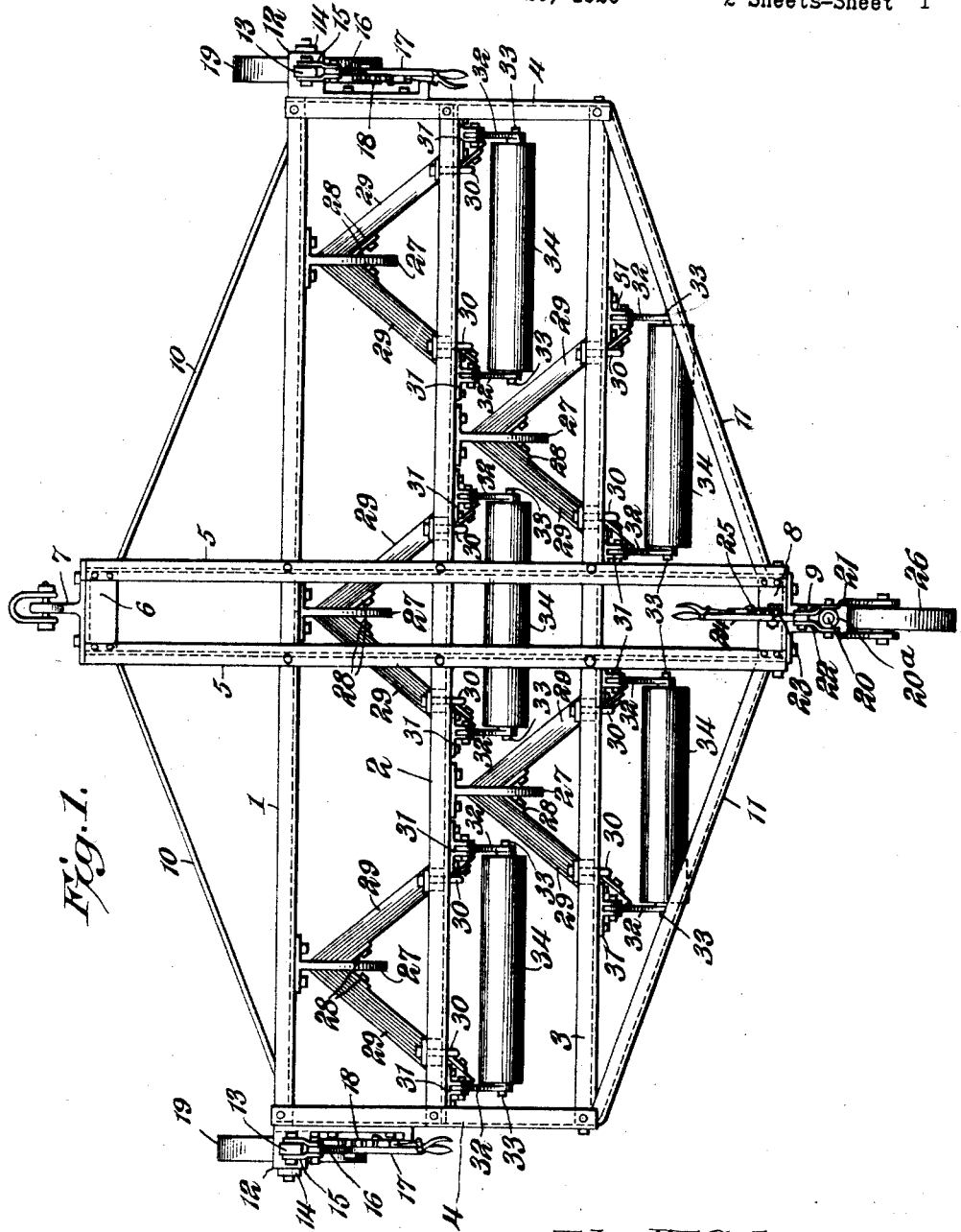

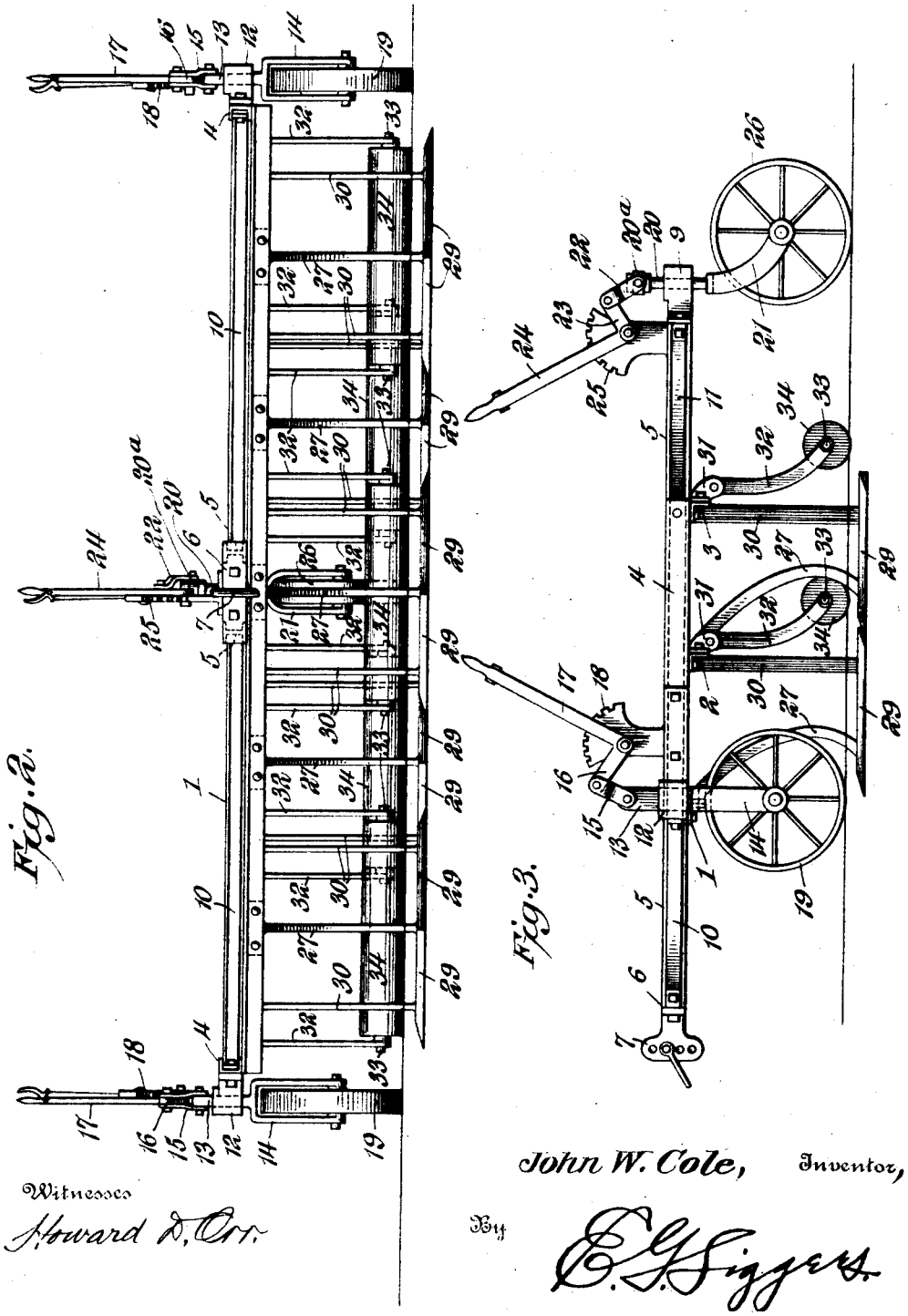

1,702,196

UNITED STATES PATENT OFFICE.

JOHN W. COLE, OF ST. FRANCIS, KANSAS.

COMBINED WEED CUTTER AND MULCH ROLLER.

Application filed December 20, 1926. Serial No. 156,016.

This invention relates to implements for tilling the soil and more particularly to a machine for cutting and killing weeds and at the same time severing and softening the top layer of soil and finally, with the same operation, of rolling and packing the latter, together with the fallen weeds, into a relatively hard, compact mass or mulch.

The object is to provide a strong and durable machine of this character which may be readily drawn over the ground to accomplish the above results, said machine being equipped with separate cutting elements which may be caused to enter a predetermined distance into the ground to cut the weeds at the roots thereof and to sever a layer of the ground of greater or less thickness, depending upon the condition of the ground and the nature of the weeds, the final rolling and packing process being accomplished by separate, individual rollers located one behind each of the separate cutters, with the result that the ground is more uniformly treated and the severing and rolling imparted alike to all inequalities therein.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a plan view of the improved machine.

Figure 2 is a front elevation of the same.

Figure 3 is a side elevation thereof.

The invention comprises a rectangular frame formed, preferably, of angle iron or I-beams suitably held together. though a stout wooden frame may be employed if desired. This frame is of elongated form and is adapted to be drawn over the ground with one of its long sides constituting the front of the machine, and while the drawings show a frame adapted to carry five cutting devices, it is to be understood that a greater or less number may be employed and the frame will be built accordingly. The frame includes a front bar or member 1, a similar intermediate bar 2 and a rear bar 3, formed of angle iron and adapted to be moved transversely across the field. The terminals of the angle iron bars are held in proper spaced relation to each other by end bars 4, formed preferably of channel iron suitably bolted or otherwise held in position, the said end bars being mounted on top of the aforesaid bars, 1, 2 and 3.

Arranged at the centers of the bars 1, 2 and 3 and mounted transversely on top thereof, are spaced draft beams 5, formed of suitable I-beams and bolted directly to the cross bars or angle irons, said beams extending a suitable distance in advance and in rear of the frame proper, the front terminals of the same being connected together by a cross member 6, which may carry a suitable clevis 7 for attachment to any source of draft power, while the rear ends are connected together by a similar cross member 8 having an outstanding, rearwardly extending bracket 9 connected thereto.

Front struts or brace bars 10 connect the front ends of the draft beams to the front corners of the frame, as shown, said struts being preferably in the form of bars or rods arranged at angles to the line of draft, while the rear ends of the draft beams are connected to the rear corners of the frame by angle iron braces 11 likewise arranged at opposite angles to the line of draft.

The frame constructed in the manner described provides a strong and rigid structure well calculated to withstand the strains and hard usage to which machines of this class are subjected and with a tractor or teams of draft animals hitched to the clevis, the strain is evenly divided throughout the frame.

Secured to the end bars 4 are brackets provided with boxings 12 located at the front corners of the frame, said boxings being vertically disposed and adapted to receive standards 13 which are adapted to be adjusted up and down in the same. The lower ends of the standards are formed into forks 14, while the upper ends of the same are provided each with a pair of swivelled links 15 the free ends of which are pivotally connected to a crank arm 16 of an operating lever 17, which is suitably pivoted at the angle thereof and which is provided with a suitable latch mechanism for coaction with an arcuate rack 18 mounted on the aforesaid bracket. The forks 14 each carry a suitable supporting wheel 19 arranged parallel to the line of draft, the standards 13 being rectangular in cross section where traversing the boxings, so as to maintain the wheels in proper position while permitting of their being raised or lowered relative to the frame, in an obvious manner, by means of the hand levers.

The aforesaid bracket located at the rear ends of the draft beams 5 is likewise provided with a vertically disposed boxing through which extends a standard 20 which is round in cross section and which carries a fork 21 at its lower end and which is provided, adjacent to its upper end, where extending above the boxing, with a swivel 20ª to which is pivotally connected a pair of links 22, the opposite ends of which are pivoted to a crank arm 23 of a pivoted operating lever 24 coacting with a toothed rack 25 which may be mounted on the cross member 8 or form part of the bracket 9 as desired. The rear fork 21 is curved rearwardly, as clearly shown in Figure 3 of the drawings, so as to permit the wheel 26 which is mounted therein, to trail or act as a caster and facilitate turning or guiding of the machine, the round standard 20 readily turning in the boxing of the bracket 9 and the swivel 20ª readily permitting said movement.

Attached to the front and intermediate frame bars 1 and 2 respectively are depending, rearwardly curved hanger arms 27 which are secured to said bars in any desired manner to render the same strong and rigid and said bars extend, normally, below the supporting wheels and the level of the ground. Rigidly connected to the lower end of said arms is the apex or point portion of V-shaped cutters, the hangers each having a correspondingly shaped terminal portion 28 for the purpose and said cutters each comprises a pair of oppositely disposed wings 29 arranged at an angle to the line of draft and having their front edges formed into cutting edges for passing along beneath the surface of the ground and severing the top layer thereof and to cut through the stalks of weeds near the roots of the latter to kill the same and to cause a pulverization of the top soil.

In the form of the machine shown in the drawings there are three of the cutters shown applied to the front bar 1 and two cutters applied to the intermediate bar 2 in staggered relation to the former, and since the wings of the front cutters overlap the wings of the rear cutters, it will be seen that a complete severance of the weeds and soil is effected when the machine is drawn forwardly by the source of power. By manipulating the side hand levers 17 and the rear hand lever 24 the depth of the cut may be altered as necessary, in an obvious manner, said depth depending on the nature of the ground and the weeds.

In order to strengthen and brace the rear terminals of the angularly disposed wings 29 of the cutters, rear hangers 30 are employed, those for the front row of cutters being attached to the intermediate bar 2 and those for the rear ends of the rear row of cutters being suitably attached to the rear cross bar 3, all of which is clearly shown in Figure 1 of the drawings.

Attached to the rear faces of the intermediate and the rear cross bars are brackets having spaced ears 31 between which are pivotally connected the upper ends of curved links 32 which extend downwardly and rearwardly and are provided at their lower ends with bearings for the reception of trunnions 33 carried in the ends of weighted rollers 34. The ears 31 and links 32 are located in positions to bring the rollers immediately behind the cutters and the width of the rollers is substantially the same as the width of the wings 29 so that the parts may be assembled beneath the frame of the machine without any interference with each other. By the provision of a plurality of V-shaped cutters of this character and by reason of the staggered relation of the cutters of the several transverse rows, a better severance of the ground as well as the roots of the weeds, etc., is obtained, and by placing a separate roller behind each cutter the same advantage is obtained, as the said rollers act by gravity to compress the ground and to pack the severed top layer of soil and pulverize the same while pressing it, together with the fallen weeds into the earth and the rollers, free to swing independently of each other, more effectually take care of inequalities in the surface of the ground.

In many regions of the plains countries of the west, the long continued hot winds of summer and the heat of the sun, with the general absence of rains during such seasons, causes a complete elimination of moisture in the ground to a great depth and it has been found from long experience in such dry country, where irrigation is impossible, that while such lack of moisture fails to prevent the growth of weeds, it is impossible to obtain a heavy crop, especially of wheat, except by cultivating, planting and growing so as to reap the harvest every alternate year. In order to do even this, with a profit to the farmer, it is necessary to prevent the drying out effects of the said high, hot winds and the action of the intense sun's rays, and to provide some means for retaining in the ground the moisture produced by the spring rains and the melting frost and snows of winter, and to prevent the growing weeds from sapping such moisture from the subsoil until time for planting the wheat. The machine of the present invention has been designed for this purpose, and as the same is drawn across a field, the cutters slip along one or two inches below the level of the ground cutting the weeds at the roots and allowing the soil to remain practically as it was originally, except that the thin top layer thus severed is in a better condition to be pulverized and packed by the following rollers. The weeds are allowed to remain on the ground and are rolled into same by the rollers, there to remain and rot and to act as a fertilizer. A field is first plowed early in the spring and the machine of the present invention is first used as soon as the weeds have gained some headway and several times thereafter, say ten or twelve times during the summer and the moisture from the preceding spring rains and the melting snows, etc. of winter, is retained in the ground by reason of the tightly packed top layer of soil excluding the drying action of the sun and winds by closing the pores of the earth and the sapping is eliminated by killing the weeds. The ground is then ready for fall planting, say in August or September, after which the field is not touched again and the grain is allowed to grow all the following winter and spring to be harvested in June or July, thus bringing about a crop every other year, which is all that is expected by expert farmers in such regions. Such methods are known as "summer tillings" and as "dry land farming" and finer crops and greater profit is obtained than where it is endeavored to obtain a crop every year.

From the foregoing it is thought the structure and operation and the great advantages obtained from the use of the machine of the present invention will be fully understood without further description or explanation.

What is claimed is:—

1. A combined weed cutter and mulch roller comprising a frame, a plurality of spaced cutters arranged beneath the frame and rigidly connected thereto, opposite supporting wheels mounted for vertical adjustment at the sides of the frame, a vertically adjustable caster wheel mounted at the rear and center of the frame, all of said wheels having means for adjusting and holding the same, means at the front of the frame for draft connection, and a separate roller located behind each cutter and loosely connected to the frame.

2. A combined weed cutter and mulch roller comprising an elongated frame, spaced parallel beams secured centrally on top of the frame and extending beyond the same at each end, brace bars connecting the end corners of the frame to the extended ends of said beams, said frame being adapted to be drawn longitudinally of the beams, a clevis carried at the front ends of the beams, a vertically adjustable supporting wheel mounted at each front corner of the frame, a vertically adjustable caster wheel mounted at the rear ends of the beams, depending hangers rigidly connected to the frame, spaced cutters secured to the lower ends of said hangers, pivoted links depending from the frame, and a gravity acting roller journalled in the lower ends of the links in rear of each cutter.

3. A combined weed cutter and mulch roller comprising a frame, vertically adjustable supporting wheels carried by the frame, said frame including spaced, parallel bars adapted to be moved transversely over the ground, rigid hanger arms depending from the bars, cutters connected to the lower ends of the arms, said cutters being spaced apart and arranged in transverse rows with the cutters of one row alternating with those of the other row, and swinging links connected to the bars and having a roller journalled in the lower ends thereof, there being a separate roller in rear of each cutter.

4. A combined weed cutter and mulch roller comprising a frame, vertically adjustable supporting wheels carried by the frame, said frame including spaced, parallel bars adapted to be moved transversely over the ground, rigid hanger arms depending from the bars, cutters connected to the lower ends of the arms, said cutters being spaced apart and arranged in transverse rows with the cutters of one row alternating with those of the other row, each cutter having wings provided with front cutting edges, the point of each cutter being supported by a hanger arm depending from one transverse bar and the terminals of the wings being supported by arms depending from a rear transverse bar, pivoted links depending from the bars having the wing supporting arms connected thereto, said links being adapted to swing upwardly and downwardly, and a weighted roller journalled in the lower ends of pairs of the links immediately in rear of each cutter to flatten and pack the top layer of soil and the weeds severed by the cutters.

5. A combined weed cutter and mulch roller comprising a frame of elongated rectangular form, said frame having a front, a rear and an intermediate bar extending lengthwise thereof and connected at their terminals by end bars, vertically adjustable supporting wheels mounted at the front corners of the frame, a rear, vertically adjustable caster wheel mounted centrally and in rear of the frame, rigid hangers depending from the front and intermediate frame bars in staggered relation to each other, cutters having right and left hand wings and connected at their points to said hangers, other rigid hangers depending from the intermediate and rear frame bars and connected to the terminals of the cutter wings, pairs of links pivotally connected to the last-named frame bars and adapted to swing transversely thereto, and a roller journalled in the lower ends of each pair of links and adapted to roll the ground immediately in rear of each cutter.

In testimony, that I claim the foregoing as my own, I have hereto affixed my signature.

JOHN W. COLE.